(12) United States Patent
Mattox et al.

(10) Patent No.: US 8,266,127 B2
(45) Date of Patent: Sep. 11, 2012

(54) SYSTEMS AND METHODS FOR DIRECTED FORUMS

(75) Inventors: John R. Mattox, Raleigh, NC (US); Jason S. Hibbets, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 201 days.

(21) Appl. No.: 11/756,334

(22) Filed: May 31, 2007

(65) Prior Publication Data
US 2008/0301115 A1    Dec. 4, 2008

(51) Int. Cl.
*G06F 17/30* (2006.01)
(52) U.S. Cl. .................................. 707/705; 709/238
(58) Field of Classification Search ......... 707/3, 999.003, 707/705; 709/238
See application file for complete search history.

(56) References Cited

U.S. PATENT DOCUMENTS

| | | | |
|---|---|---|---|
| 5,649,182 A | 7/1997 | Reitz | |
| 6,209,100 B1 * | 3/2001 | Robertson et al. | 726/2 |
| 6,223,165 B1 * | 4/2001 | Lauffer | 705/8 |
| 6,345,257 B1 | 2/2002 | Jarrett | |
| 6,374,261 B1 | 4/2002 | Alvarez et al. | |
| 6,446,058 B1 | 9/2002 | Brown | |
| 6,477,667 B1 | 11/2002 | Levi et al. | |
| 6,493,702 B1 | 12/2002 | Adar et al. | |
| 6,519,629 B2 | 2/2003 | Harvey et al. | |
| 6,691,162 B1 * | 2/2004 | Wick | 709/224 |
| 6,735,592 B1 * | 5/2004 | Neumann et al. | 1/1 |
| 6,739,508 B2 | 5/2004 | Ushioda et al. | |
| 6,938,068 B1 * | 8/2005 | Kraft et al. | 709/203 |
| 6,988,126 B2 | 1/2006 | Wilcock et al. | |
| 7,007,235 B1 * | 2/2006 | Hussein et al. | 715/751 |
| 7,028,228 B1 | 4/2006 | Lovy et al. | |
| 7,069,480 B1 | 6/2006 | Lovy et al. | |
| 7,143,089 B2 | 11/2006 | Petras et al. | |
| 7,159,011 B1 | 1/2007 | Knight et al. | |
| 7,359,894 B1 | 4/2008 | Liebman et al. | |
| 7,382,247 B2 | 6/2008 | Welch et al. | |
| 7,437,382 B2 | 10/2008 | Zhang et al. | |
| 7,472,071 B2 * | 12/2008 | Marks et al. | 705/9 |
| 7,543,232 B2 * | 6/2009 | Easton et al. | 715/708 |
| 7,546,254 B2 * | 6/2009 | Bednarek | 705/26 |
| 7,548,914 B2 | 6/2009 | Bell et al. | |
| 7,558,828 B1 * | 7/2009 | Panzer | 709/206 |
| 7,600,160 B1 | 10/2009 | Lovy et al. | |

(Continued)

FOREIGN PATENT DOCUMENTS

WO    WO 99/39279    *    8/1999

(Continued)

OTHER PUBLICATIONS

JustAnswer Site, "JustAnswer. Going Green", copyright 2003-2012, 1 page, accessed online at <http://www.justanswer.com/environment> on Feb. 4, 2012.*

(Continued)

*Primary Examiner* — Phuong Thao Cao
(74) *Attorney, Agent, or Firm* — Lowenstein Sandler PC

(57) ABSTRACT

An embodiment relates generally to a method of providing a directed discussion. The method includes providing for an on-line forum and providing a list of available personnel within the on-line forum. The method also includes receiving a query in the on-line forum and directing the query to the best available personnel on the list of available personnel.

15 Claims, 8 Drawing Sheets

U.S. PATENT DOCUMENTS

| | | |
|---|---|---|
| 7,603,350 B1 | 10/2009 | Guha |
| 7,613,690 B2 | 11/2009 | Chowdhury et al. |
| 7,617,127 B2 | 11/2009 | Hunt et al. |
| 7,664,747 B2 | 2/2010 | Petras et al. |
| 7,668,838 B2 | 2/2010 | Baio et al. |
| 7,698,242 B2 | 4/2010 | Van Camp et al. |
| 7,752,314 B2 | 7/2010 | Trevor et al. |
| 7,788,322 B2 | 8/2010 | Busey |
| 7,925,788 B2 | 4/2011 | Hibbets |
| 2001/0032244 A1* | 10/2001 | Neustel ............... 709/206 |
| 2001/0037317 A1 | 11/2001 | Freiwirth et al. |
| 2002/0049738 A1 | 4/2002 | Epstein |
| 2002/0055935 A1 | 5/2002 | Rosenblum |
| 2002/0087520 A1* | 7/2002 | Meyers ............... 707/3 |
| 2002/0123983 A1 | 9/2002 | Riley et al. |
| 2002/0169783 A1 | 11/2002 | Kreulen et al. |
| 2002/0174106 A1* | 11/2002 | Martin ............... 707/3 |
| 2002/0194164 A1* | 12/2002 | Morrow et al. ............... 707/3 |
| 2003/0028525 A1* | 2/2003 | Santos et al. ............... 707/3 |
| 2003/0033302 A1 | 2/2003 | Banerjee et al. |
| 2003/0101083 A1* | 5/2003 | Venkatesh et al. ............... 705/8 |
| 2003/0101127 A1* | 5/2003 | Cornelius ............... 705/37 |
| 2003/0144895 A1* | 7/2003 | Aksu et al. ............... 705/9 |
| 2003/0163356 A1* | 8/2003 | Marks et al. ............... 705/7 |
| 2003/0196094 A1 | 10/2003 | Hillis et al. |
| 2003/0221123 A1 | 11/2003 | Beavers |
| 2004/0054520 A1* | 3/2004 | Dehlinger et al. ............... 704/5 |
| 2004/0107125 A1* | 6/2004 | Guheen et al. ............... 705/7 |
| 2004/0199573 A1 | 10/2004 | Schwartz et al. |
| 2005/0120011 A1* | 6/2005 | Dehlinger et al. ............... 707/3 |
| 2005/0138115 A1* | 6/2005 | Llamas et al. ............... 709/203 |
| 2005/0144151 A1 | 6/2005 | Fischman et al. |
| 2005/0256866 A1 | 11/2005 | Lu et al. |
| 2006/0004601 A1* | 1/2006 | Marks ............... 705/1 |
| 2006/0013367 A1 | 1/2006 | Sawyer et al. |
| 2006/0064486 A1 | 3/2006 | Baron et al. |
| 2006/0106788 A1 | 5/2006 | Forrest |
| 2006/0122992 A1 | 6/2006 | Bellaiche et al. |
| 2006/0136869 A1 | 6/2006 | Lamm et al. |
| 2006/0161524 A1 | 7/2006 | Roy et al. |
| 2006/0167846 A1* | 7/2006 | Nevin et al. ............... 707/3 |
| 2006/0200356 A1* | 9/2006 | Wan ............... 705/1 |
| 2006/0235932 A1* | 10/2006 | Celi et al. ............... 709/207 |
| 2006/0242583 A1* | 10/2006 | MacNaughton et al. ..... 715/733 |
| 2006/0244818 A1* | 11/2006 | Majors et al. ............... 348/14.08 |
| 2006/0252547 A1* | 11/2006 | Mizrahi et al. ............... 463/42 |
| 2006/0271545 A1* | 11/2006 | Youn et al. ............... 707/10 |
| 2006/0277091 A1 | 12/2006 | Kochikar et al. |
| 2006/0282304 A1 | 12/2006 | Bedard et al. |
| 2006/0288087 A1* | 12/2006 | Sun ............... 709/218 |
| 2007/0067405 A1* | 3/2007 | Eliovson ............... 709/206 |
| 2007/0094228 A1* | 4/2007 | Nevin et al. ............... 706/60 |
| 2007/0106659 A1 | 5/2007 | Lu et al. |
| 2007/0174247 A1 | 7/2007 | Xu et al. |
| 2007/0174254 A1* | 7/2007 | Toong et al. ............... 707/3 |
| 2007/0179835 A1 | 8/2007 | Ott et al. |
| 2007/0198319 A1 | 8/2007 | Sciuk |
| 2007/0198510 A1 | 8/2007 | Ebanks |
| 2007/0219995 A1 | 9/2007 | Heumann et al. |
| 2007/0260587 A1* | 11/2007 | Mohan ............... 707/3 |
| 2007/0274495 A1* | 11/2007 | Youd et al. ............... 379/210.01 |
| 2007/0282781 A1* | 12/2007 | Mathiesen et al. ............... 707/1 |
| 2007/0288292 A1* | 12/2007 | Gauger ............... 705/9 |
| 2008/0021884 A1* | 1/2008 | Jones et al. ............... 707/3 |
| 2008/0046394 A1 | 2/2008 | Zhou et al. |
| 2008/0059447 A1* | 3/2008 | Winner et al. ............... 707/5 |
| 2008/0082486 A1* | 4/2008 | Lermant et al. ............... 707/3 |
| 2008/0082607 A1 | 4/2008 | Sastry et al. |
| 2008/0091686 A1* | 4/2008 | Beard ............... 707/10 |
| 2008/0098109 A1 | 4/2008 | Faihe et al. |
| 2008/0133667 A1* | 6/2008 | Raguseo ............... 709/205 |
| 2008/0147741 A1* | 6/2008 | Gonen et al. ............... 707/104.1 |
| 2008/0147863 A1* | 6/2008 | Evanchik et al. ............... 709/226 |
| 2008/0162376 A1* | 7/2008 | Roulston ............... 705/36 R |
| 2008/0201321 A1* | 8/2008 | Fitzpatrick et al. ............... 707/5 |
| 2008/0228504 A1 | 9/2008 | Nguyen et al. |
| 2008/0243729 A1* | 10/2008 | Icenoggle ............... 706/12 |
| 2008/0299953 A1* | 12/2008 | Rao ............... 455/414.1 |
| 2008/0301091 A1 | 12/2008 | Hibbets et al. |
| 2009/0063386 A1 | 3/2009 | Hibbets |
| 2009/0187626 A1* | 7/2009 | Degaugue ............... 709/205 |

FOREIGN PATENT DOCUMENTS

| | | | |
|---|---|---|---|
| WO | WO 01/35272 | * | 5/2001 |
| WO | WO 01/53970 A2 | * | 7/2001 |

OTHER PUBLICATIONS

U.S. Appl. No. 11/747,220, filed May 10, 2007, Jason S. Hibbets.
U.S. Appl. No. 11/754,590, filed May 29, 9007, N. Lee Faus.
U.S. Appl. No. 11/759,785, filed Jun. 7, 2007, N. Lee Faus et al.

* cited by examiner

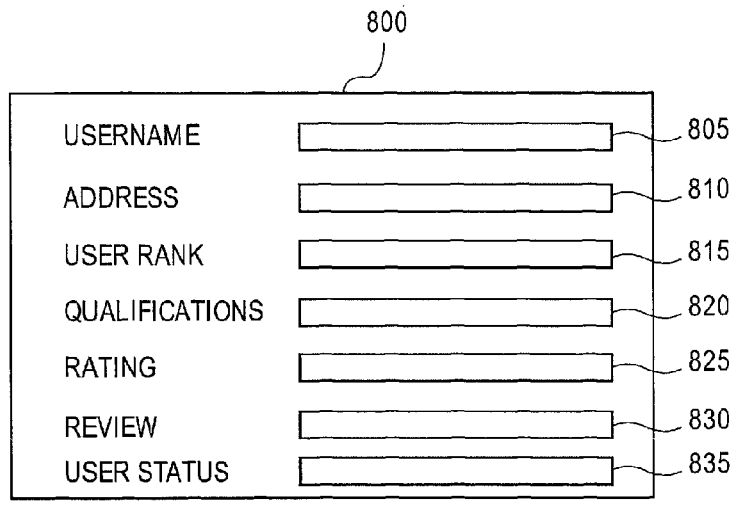
FIG. 8
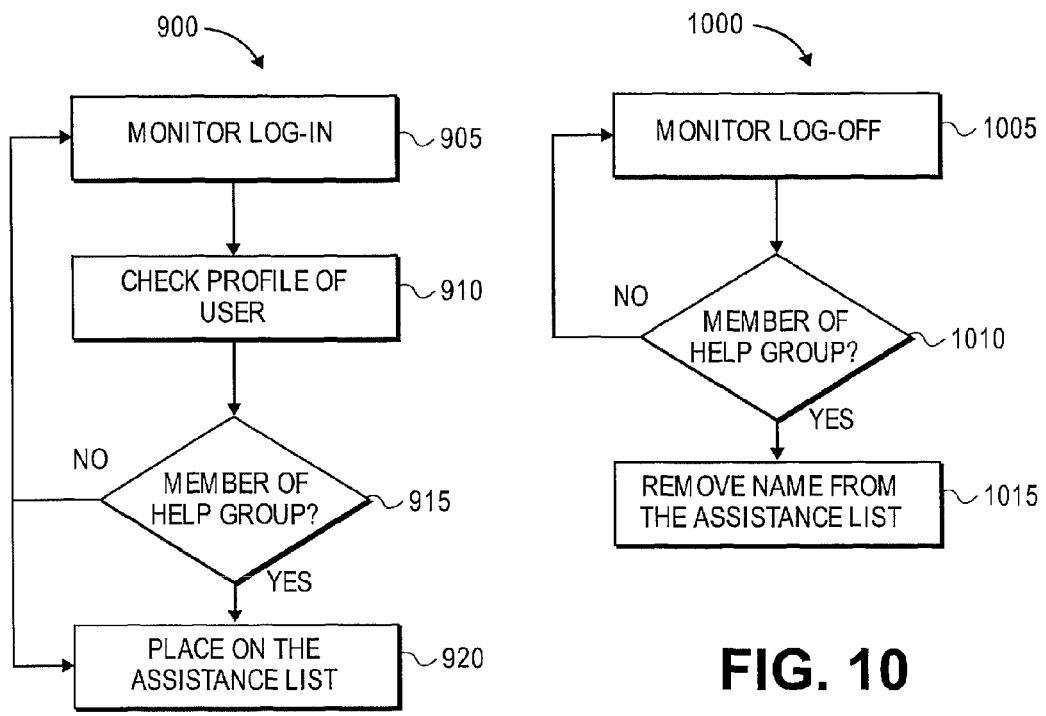
FIG. 9
FIG. 10

SYSTEMS AND METHODS FOR DIRECTED FORUMS

FIELD

This invention relates generally to forums, more particularly, to systems and methods for directed forums.

DESCRIPTION OF THE RELATED ART

A forum can be regarded as essentially a website composed of a number of member-written threads. Each thread entails a discussion or conversation in the form of a series of user-member written posts. These threads remain saved on the forum website for future reading indefinitely or until deletion by a moderator.

Software packages that implement forum websites are generally well known. These software packages are widely available on the Internet in a variety of programming languages such as HypeterText Preprocess ("PHP"), Perl, Java, and active server pages ("ASP"). The configuration and records of posts can be stored in text files or in a database.

Although forums are an effective tool to exchange information, they are not without drawbacks and disadvantages. For example, a user trying to obtain information on a particular issue may find it very difficult to locate a definite answer on the issue. Accordingly, there is a need to improve the likelihood of a user to obtain an answer for any issue the user may have.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIG. 8 illustrates an exemplary user profile in accordance with yet another embodiment; and FIG. 9 depicts an exemplary flow diagram implemented by the directed forum module in accordance with yet another embodiment;

FIG. 10 depicts another exemplary flow diagram implemented by the directed forum module in accordance with yet another embodiment.

DETAILED DESCRIPTION OF EMBODIMENTS

Figure 1:
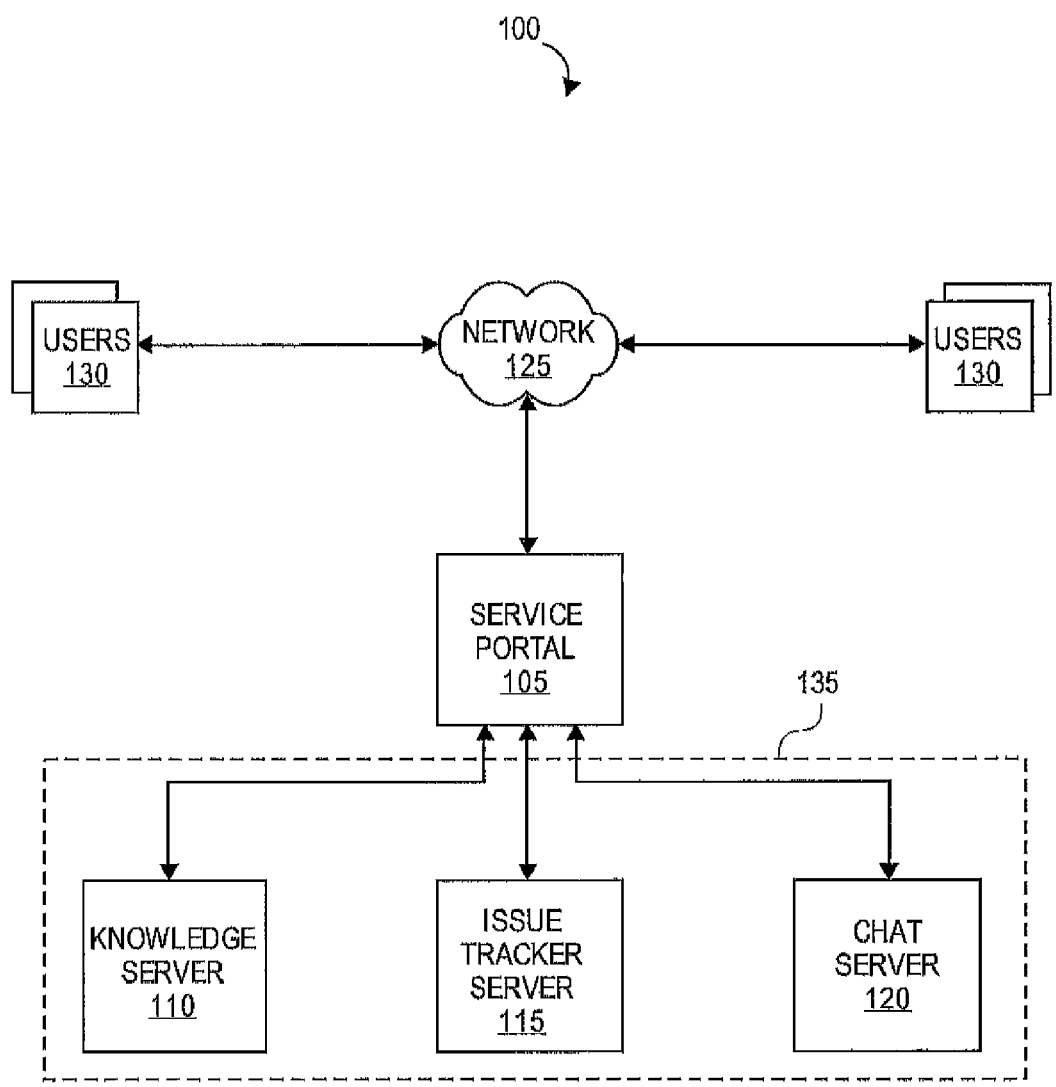
FIG. 1 depicts an exemplary system in accordance with an embodiment.

For simplicity and illustrative purposes, the principles of the present invention are described by referring mainly to exemplary embodiments thereof. However, one of ordinary skill in the art would readily recognize that the same principles are equally applicable to, and can be implemented in, all types of information portals, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments pertain generally to a directed forum in a service portal. More particularly, a directed forum module can be configured to provide a forum for a user community of the service portal. The directed forum module can also be configured to provide a list of available personnel in a technical assistance (or help) group. More particularly, the directed forum module can generate a graphical user interface ("GUI") widget (i.e., an on-line widget) such as a list box, dialog box, etc., that contains a listing of the available personnel in the help group that are logged in and available to assist users. Unavailable personnel can be displayed as a separate listing or included with the listing of available personnel but with a busy icon. The help group can comprise of technical support personnel, technical experts, and qualified users. A technical support personnel can be a user employed by the administrators of the service portal to provide technical support for the user community. A technical expert is a user that has credentials certified by the user community in a particular field and may or may not be employed by the service portal. A qualified user ("good samaritan") can be a user that the user community that has some technical skill and would like to be helpful. The status of a user can be maintained in a profile associated with the user.

The directed forum can monitor the log-ins of users into the service portal. If the profile of a logged-in user indicates that the user is part of the help group, the direct forum module places the user in the on-line widget. Alternatively, the directed forum module can periodically monitor a logged-in user list maintained by the service portal. The directed forum module can then search the logged-in user list for the anyone in the help group to place on the on-line widget.

The directed forum can also be configured to direct questions from the users to the appropriate person(s) in the on-line help group. More specifically, a user can issue a question in the directed forum. The directed forum can be configured to parse the question for key words (e.g., Linux, Red Hat, configuration file, etc.). The directed forum can then use the key words to search the user profiles of the available personnel in the on-line help group for the same key words. The directed forum can forward an electronic message to the matching users in the on-line help group based on key words. Accordingly, a user can get an answer to his issue or question in a time efficient manner because the issue has been directed to available person who is likely to have an answer.

FIG. 1 illustrates an exemplary system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the system 100 includes a service portal 105 coupled to a network 125. Users 130 can interface with the service portal 105 through the network 125. The network 125 can be a combination of local area networks, wide area networks, public networks, and private networks or combinations thereof such as the Internet.

The users 130 can be interface with the service portal 105 using computing platforms such as personal computers, workstations, private local area networks (e.g., business entity or government entity) or other similar device that can provide network access and interact with the service portal 105.

In some embodiments, the service portal 105 can be configured to provide services. As a non-limiting example, the service portal 105 can be configured to provide information for users to research, compare and purchase software, hardware and consulting services in support of the those software and/or hardware purchases. The service portal 105 can also be configured to provide support services by subscription to those same software and/or hardware purchases. The service portal 105 can further be configured to provide a knowledgebase for a user in a community can search for answers regarding issues. The community can comprise of registered and non-registered users.

The service portal 105 can be configured to provide at least the described services with a service backend 135. The service backend 135 can comprise at least a knowledge server 110, an issue tracker server 115 and a chat server 120.

The knowledge server 110 can be configured to provide a knowledgebase for the system 100. The knowledgebase can comprise of Wiki pages, articles, frequently asked questions, transcripts of chat sessions, forums, and other informational items related to issues deemed worth discussing by the community. The knowledge server 110 can also be configured to search and retrieve requested informational items from third party sites such as Google™, Yahoo™, etc. The knowledge server 110 can then rank and prioritize the search results from internal and external sources for the requesting user based on a single interface provided by the server portal 105. In some embodiments, the knowledge server 110 can be implemented on a separate server using open-source technologies.

The service portal 105 can also be configured to interface with the issue tracker server 115, which provide support services for the service portal 105. More particularly, a user may have a problem or issue with a purchased software and/or hardware from the service portal 105. The user can return to the service portal 105 and request support services based on a purchased service subscription through a user interface generated by the service portal 105. The service portal 105 can redirect the support request to the issue tracker server 115. The issue tracker server 115 can open an associated service ticket for resolution by support personnel. The issue tracker server 115 can also be configured to attach transcripts of any chat sessions between the support personnel and the user as well as documenting the solution(s) to the issue of the user. In some aspects, the documented solution can be converted into an article, added to a frequently asked question list, Wiki page, etc., and passed onto the knowledge server 110.

The chat server 120 can be configured to couple with the service portal 105. A user with an issue or question can log into the service portal 105 and search for solutions and/or answers. The service portal 105 can generate a user interface and display an option for requesting assistance via a chat session. If a user selects this option, the service portal 105 can pass the request over to the chat server 120. The chat server 120 can be configured to provide the chat session to the user via another user interface provided by the service portal 105.

The chat server 120 can also be configured to save the chat sessions for later review. For example, support personnel can turn the chat session into an article or extract discussed solutions in the chat sessions into or add to a frequently asked questions list.

Figure 2:
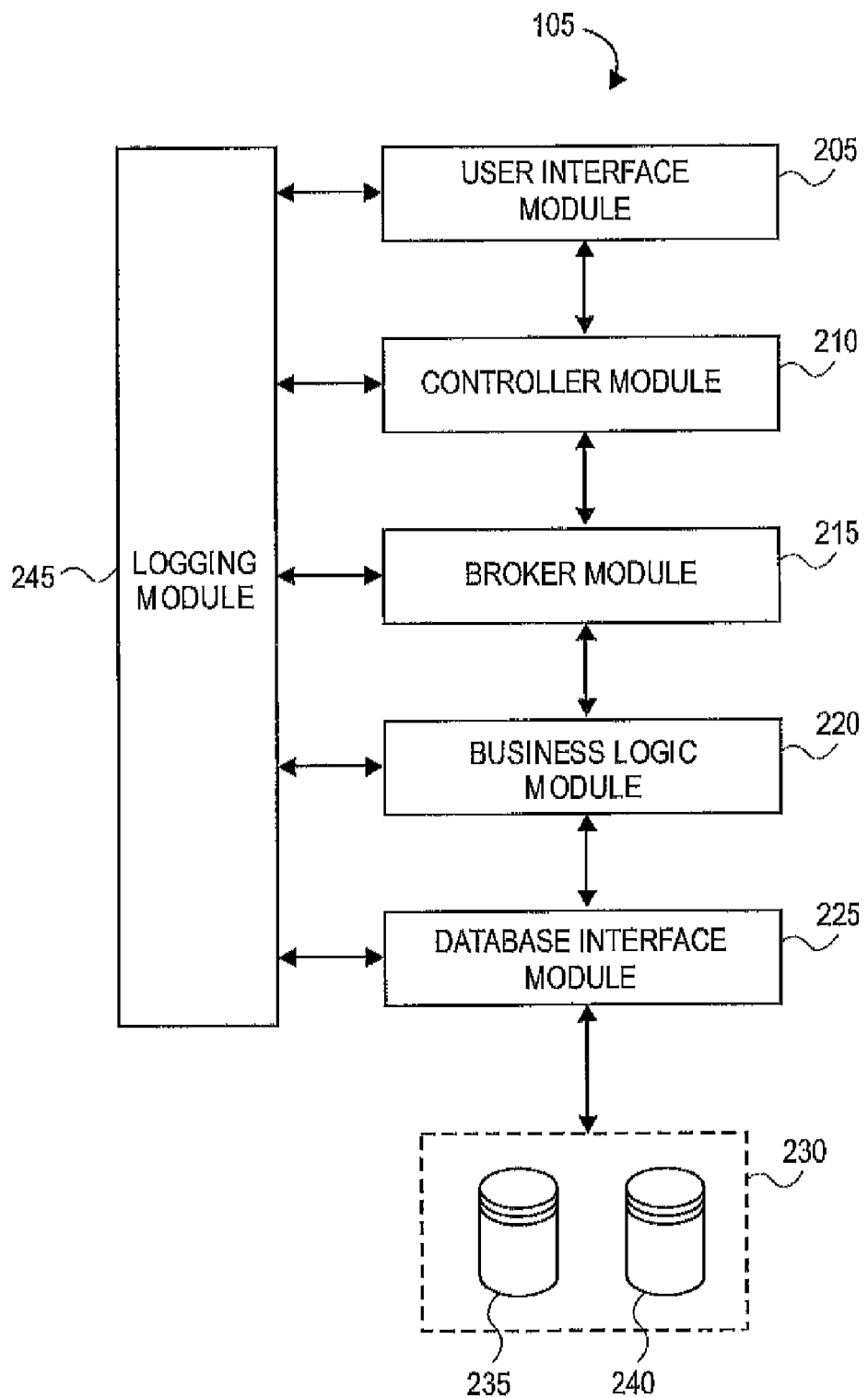
FIG. 2 illustrates an exemplary service portal of the system shown in FIG. 1 in accordance with another embodiment.

FIG. 2 illustrates a more detailed block diagram of the service portal 105 in accordance with another embodiment. It should be readily apparent to those of ordinary skill in the art that the service portal 105 depicted in FIG. 2 represents a generalized schematic illustration and that other components may be added or existing components may be removed or modified.

As shown in FIG. 2, the service portal 105 can comprise a user interface module 205, a controller module 210, a broker module 215, a business logic module, a database interface module 225, and a logging module 245. The user interface module 205 can be configured to generate the graphical user interfaces ("GUIs") for users to interact with service portal 105. The user interface module 205 can generate the necessary functionality of the GUIS based on hypertext markup language ("HTML") code, cascading style sheets ("CSS") and/or Java Server Pages ("JSP").

The user interface module 205 can be configured with a controller module 210, which is configured to provide code support for the functionality embedded in the GUIs of the user interface module 205. More particularly, the controller module 210 can comprise DWR, Dojo, and a library of JavaScript apps. The controller module 210 can be implemented using direct web remoting (DWR). DWR can be considered a Java and JavaScript open source library which allows a programmer to write Asynchronous JavaScript and XML ("Ajax") web applications or interactive web applications. DWR allows generally JavaScript code in the GUI generated by the user interface module 205 to use Java methods.

The Dojo component can be considered an open-source JavaScript Toolkit to construct the dynamic web user interfaces. As such, the controller module 210 can dynamically generate user interfaces to pass along to the user interface module 205 for display to a user.

The library of JavaScript apps can define a list of predetermined functionality that users are likely to call. For example, one JavaScript can be "Get Price of Product X".

The broker module 215 can also be coupled with business logic 220, which is configured to contain the logic to provide the desired business services from the broker module 215 such as processing requests for the database 230. The business logic module 220 can also provide a schema for inquiries to the databases 230. The databases 230 can, abstractly, contain two databases: a user profile database 235 and a product catalog 240. The databases 230 can be implemented using any type of database systems provided by vendors such as MySQL, Oracle, Sybase, International Business Machines, etc. The business logic module 220 can provide the schema to formulate queries to pass to the databases 230 through the database interface module 225. The business logic module 220 can be implemented using an open source lightweight framework such as Spring Application Framework supported by data access objects, beans, and manager.

The broker module 215 can also be coupled with business logic module 220, which is configured to provide a schema for inquiries to the databases 230. The databases 230 can, abstractly, comprise of two databases: a user profile database 235 and a product catalog 240. The databases 230 can be implemented using any type of database systems provided by vendors such as Oracle, Sybase, International Business Machines, etc. The business logic module 220 can provide the schema to formulate queries to pass to the databases 230 through the database interface module 225. The business logic module 220 can be implemented using an open source lightweight framework such as Spring Application Framework supported by data access objects, beans, and manager.

The database interface module 225 can be configured to provide an abstraction between the databases 230 and the business logic module 220. The database interface module 225 can be implemented with Hibernate or other similar abstractions. The database interface module 225 provides object relational mapping and persistence management with the databases 230.

The modules 205-225 of the service portal 105 can also be implemented using an open source servlet container and webserver such as Tomcat™ in some embodiments. Other embodiments could use proprietary servlet container and webserver technologies.

The logging module 245 can be configured to couple with the user interface module 205, the controller module 210, the broker module 215, the business logic module 220 and the database interface module 225. The logging module 245 can also be configured to provide logging and exception handling for all the coupled modules 205-225. The aforementioned module can provide functions which may be commonly called by the rest of the modules 205-225 of the service portal 105. The logging module 245 can be implemented using aspect-oriented programming as known to those skilled in the art.

Figure 3:
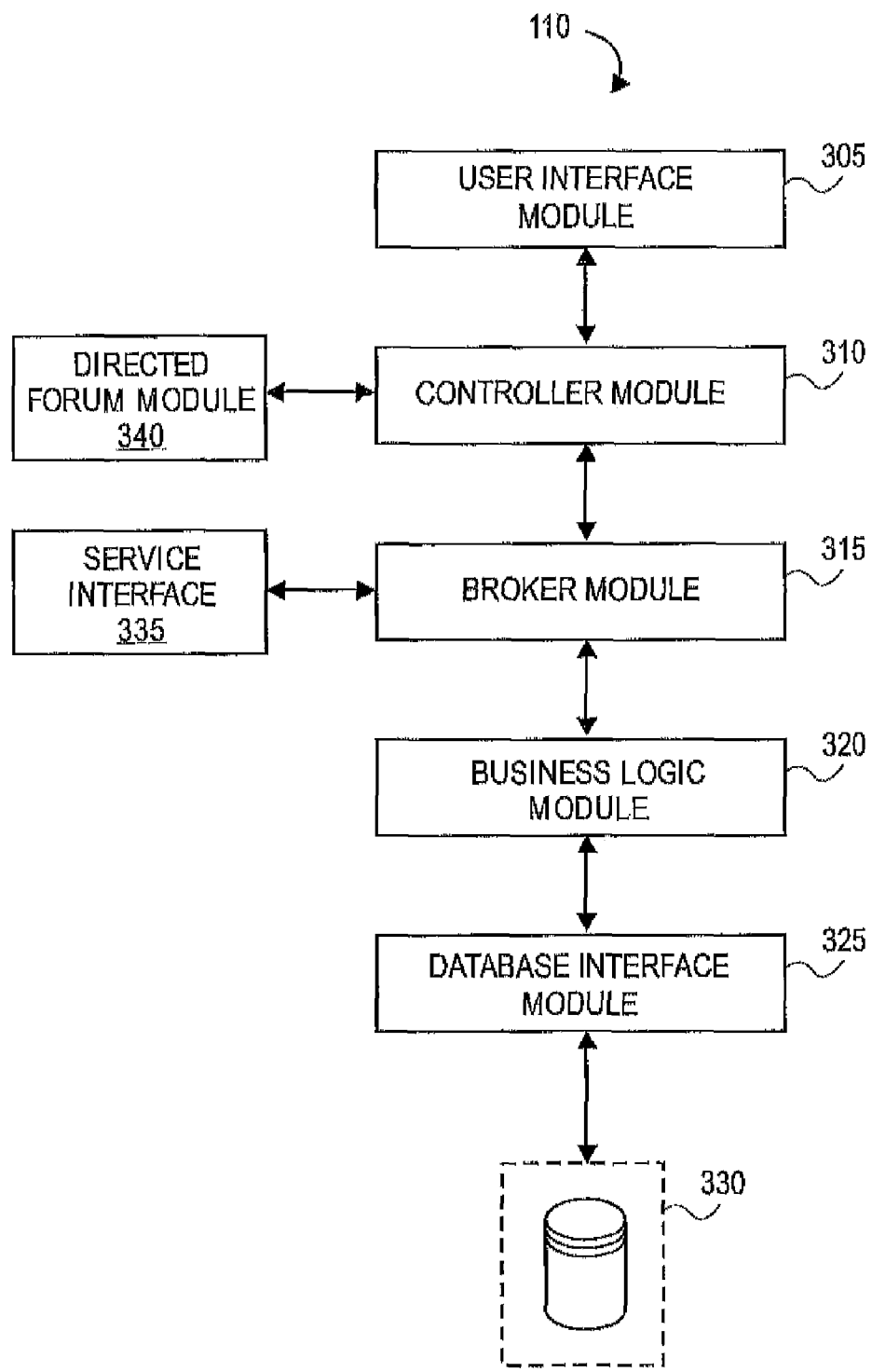
FIG. 3 depicts an exemplary knowledge server of the system shown in FIG. 1 in accordance with yet another embodiment.

FIG. 3 illustrates a more detailed block diagram of the knowledge server 110 in accordance with another embodiment. It should be readily apparent to those of ordinary skill in the art that the knowledge server 110 depicted in FIG. 3 represents a generalized schematic illustration and that other components may be added or existing components may be removed or modified.

FIG. 2 and FIG. 3 share some common components. As such, the description of the common components is being omitted and the description of these components with respect to the FIG. 2 is being relied upon to provide adequate description of the common components.

As shown in FIG. 3, the knowledge server 110 can comprise at least a user interface module 305, a controller module 310, a broker module 315, a business logic module 320 and a database interface module 325.

Similar to the service portal 105, the user interface module 305 of the knowledge server 110 can be configured to provide the GUIs for users to interact with the knowledge server 110. The functionality for selected actions by the users is provided by the controller module 310. The controller module 310 can be configured to provide the associated code for the requested functionality of the selected action in the GUI. The broker module 315 can be configured to provide high-level business logic for the knowledge server 110. More particularly, the broker module 315 can provide filtering for the requests entering the knowledge server 110. For these requests, the broker module 315 can receive these requests from the service portal 105 through the server interface 335. The server interface 335 can be implemented using simple object access protocols, web services, etc. The knowledge server 110 can also use the server interface 335 to return requested information to the service portal 105. Unlike the service portal 105, the knowledge server 110 can be configured to prevent direct access to the knowledge server 110 but can only be accessed through the service portal 10 5.

The broker module 315 of the knowledge server 110 can also be coupled to the business logic module 320, which is configured to contain the logic to provide the desired business services as received from the broker module 315 such as processing requests for the database 330. The business logic module 325 can also provide a schema for queries into the knowledgebase database 330. The database interface module 325 can be configured to provide a level of abstraction between the queries from the broker module 320 to the actual physical implementation of the knowledgebase database 330. As previously described, the knowledgebase database 330 can be implemented with database architectures provided by vendors such as MySQL, Oracle, Sybase, International Business Machines, and other similar manufacturers.

The modules 305-325 of the knowledge server 110 can also be implemented using an open source servlet container and webserver such as Tomcat™ in some embodiments. Other embodiments could use proprietary servlet container and webserver technologies.

Figure 4:
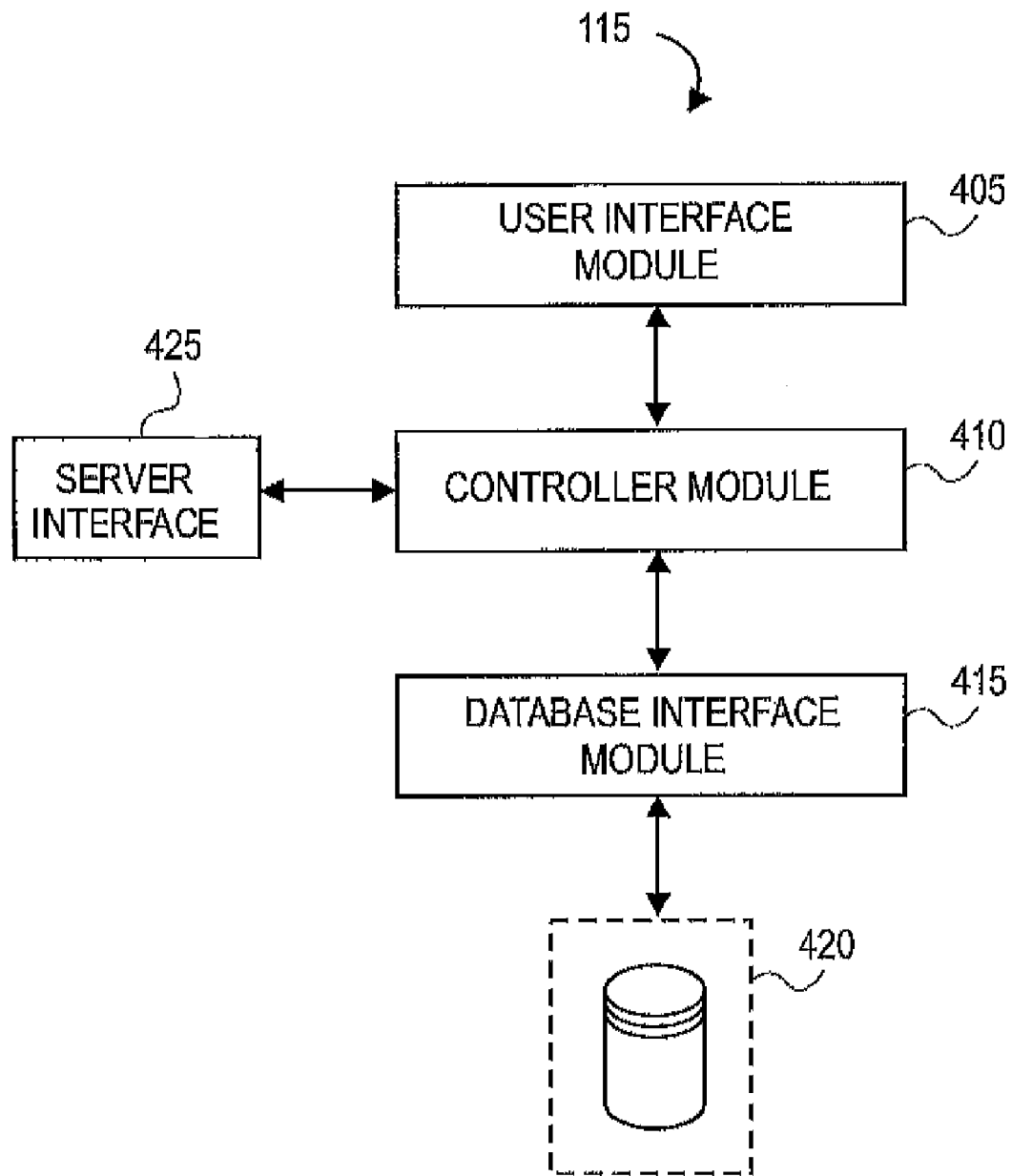
FIG. 4 illustrates an exemplary issue tracker server of the system shown in FIG. 1 in accordance with yet another embodiment.

FIG. 4 illustrates a more detailed block diagram of the issue tracker server 115 in accordance with another embodiment. It should be readily apparent to those of ordinary skill in the art that the issue tracker server 115 depicted in FIG. 4 represents a generalized schematic illustration and that other components may be added or existing components may be removed or modified.

As shown in FIG. 4, the issue tracker server 115 can comprise a user interface module 405, a controller module 410, a database interface module 415, and a server interface 425. Similar to the service portal 105 and the knowledge server 110, the user interface module 405 of the issue tracker server 115 can be configured to generate GUIs for the service portal 105 to interface thereto. As with the knowledge server 110, the service portal 105 provides a unified interface to the issue tracker server 115. The service portal 105 can be configured to receive requests from users to access the issue tracker server 115. The received requests are processed by the issue tracker server 115 and any information is returned using the issue tracker server's GUIs as generated by the user interface module 405. The service portal 105 reformats any returning information from the issue tracker server 115 and the other servers in a unified GUI generated by the user interface module 105 of the service portal 105. Accordingly, a user can be presented with information from the servers (110-120) in a consistent format.

The user interface module 405 can be implemented using HTML code, CSS sheets, Hypertext Pre-Processor ("PHP") code and/or Ruby on Rails (ROR) code. The controller module 410 can provide the associated code for the functionality provided by the GUIs generated by the user interface module 405.

The controller module 410 can be configured to communicate with the user interface module 205, controller module 210, and business logic module 220, as shown in FIG. 2, through the server interface 425. The server interface 425 can use SOAP and/or web service protocols over the Internet to provide a communication channel to the other modules.

The controller module 410 can also be configured to interface with the database 420. The database 420 can be configured to store the open and closed service tickets. The database 420 can also be configured to store links to or the actual articles, chats session used to resolve the issue. In some embodiments, the database 420 can be implemented using MySQL 5.x database or other open source database. Other embodiments, the database 420 can be implemented using proprietary databases such as Oracle, Sybase, IBM, etc.

Although FIG. 4 depicts the user interface module 405, controller module 410, and the database interface module 415 as separate components, these modules (405-415) can be implemented using LAMP, which is an open source Web development platform based on Linux, Apache, MySQL, and PHP.

Figure 5:
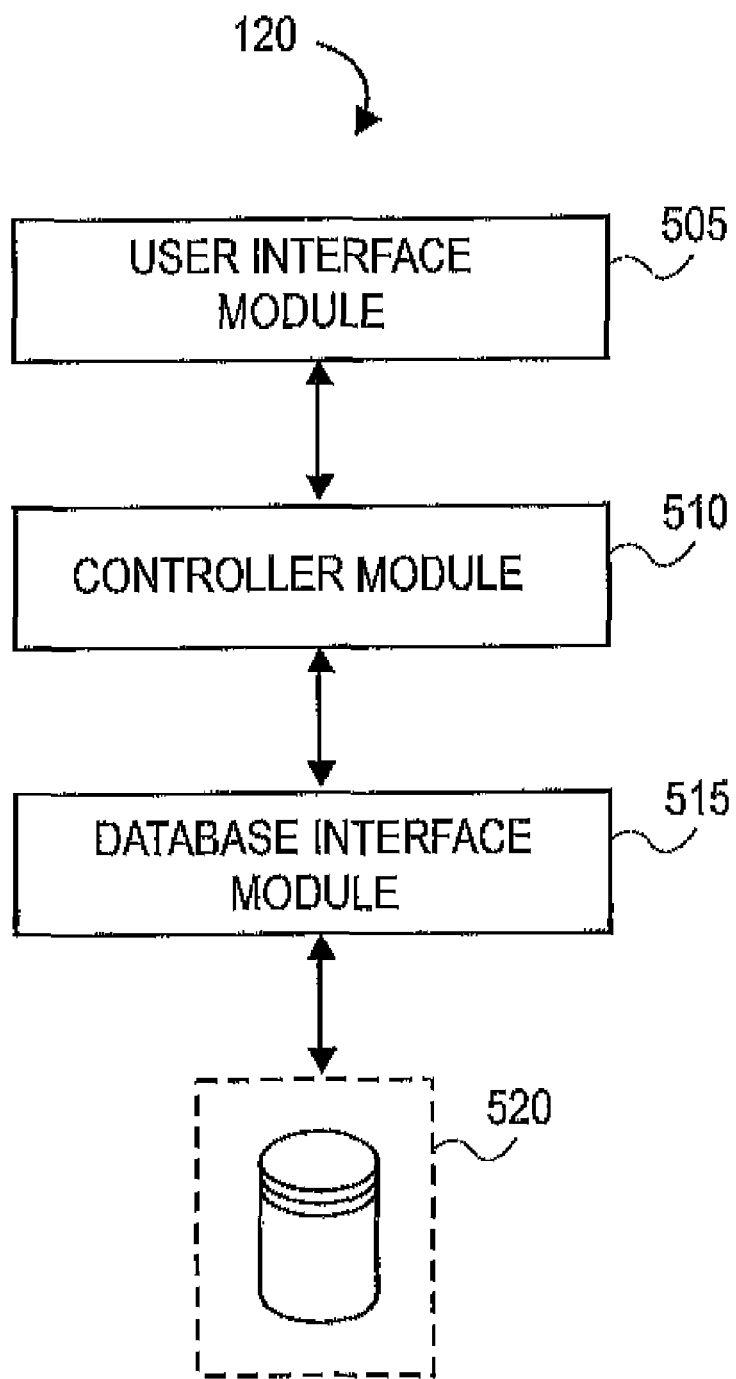
FIG. 5 depicts an exemplary chat server of the system shown in FIG. 1 in accordance with yet another embodiment.

FIG. 5 illustrates a more detailed block diagram of the chat server 120 in accordance with another embodiment. It should be readily apparent to those of ordinary skill in the art that the chat server 120 depicted in FIG. 5 represents a generalized schematic illustration and that other components may be added or existing components may be removed or modified.

The chat server 120 can be configured to provide chat services for users. The chat server 120 can provide a communication link between users and a group of support personnel. The users can request access to support through a GUI of the service portal 105. Some embodiments can use Wildfire to provide group and instant messaging service using the Extensible Messaging and Presence Protocol ("XMPP").

As shown in FIG. 5, the chat server 120 can comprise a user interface module 505, a controller module 510, a database interface module 515 and a database 520. The user interface module 505 of the chat server 120 can be configured to generate GUIs for the service portal 105 to interface thereto. The user interface module 505 can be implemented using HTML code, CSS, and/or Java Server pages.

As with the knowledge server 110 and the issue tracker server 115, the service portal 105 provides a unified interface to the chat server 120. The service portal 105 can be configured to receive requests from users to access the chat server 115. The received requests are processed by the chat server 120 to start a chat session with someone from a group of technical support personnel.

The received requests for chats can be processed by the controller module 510, which contains the associated code for the selected function in the GUI by a user. The controller module 510, in some embodiments, can be implemented using DWR.

The controller module 510 can also interface with a database interface module 515. The database interface module 515 can be configured to translate queries from the controller module 510 to appropriate format of the database 520 to store and retrieve information. The information stored in the database 520 can comprise of chat sessions between users and support personnel. In some embodiments, the database 520 can be implemented with a MySQL database. Returning to the database interface module 515, this module 515 can be implemented using plain old Java objects as known to those skilled in the art.

Although FIG. 5 depicts the user interface module 505, controller module 510, and the database interface module 515 as separate components, other embodiments can implement the functionality of these modules can be implemented using Tomcat Servlet container and web server from Apache Software Foundation.

Returning to FIG. 3, the knowledge server 110 can be configured with a directed forum module 340 embedded in the controller module 310. The directed forum module 340 can be configured to provide a forum with directed technical support. More particularly, when a user logs-in to the directed forum, the user can be presented with a GUI widget that displays a list of the logged-in members of a technical assistance (help) group. In some embodiments, the list of logged-in members can display the status of each member, whether the member is free or busy. Accordingly, the user can directly contact an available person in the technical assistance group for assistance.

Alternatively, the user can input a thread with an issue in the directed forum. The directed forum module can be configured to parse the initial query of the thread for key words. The key words can be a list of predetermined terms that the moderator and/or the user community has agreed upon to be relevant to the directed forum. For example, for a directed forum about Linux support, some key words can be "Linux", "installation", "configuration files", etc.

With the key words from the query, the directed forum module can be configured to search the user profile of the logged-in members of the help group to search for the best available member to answer the question. As a non-limiting example, the directed forum module can be configured to search for the same key words in the user profiles of the logged-in members. The members of the help group that have highest matching key words in the user profile with the key words from the query user profiles can be considered the best available group to assist the requesting user. Accordingly, the directed forum module can notify the members of the best available group of the pending question in the directed forum either by sending a universal resource locator (URL) to the query or a copy the query via electronic communication means such as electronic mail or message.

Figure 6:
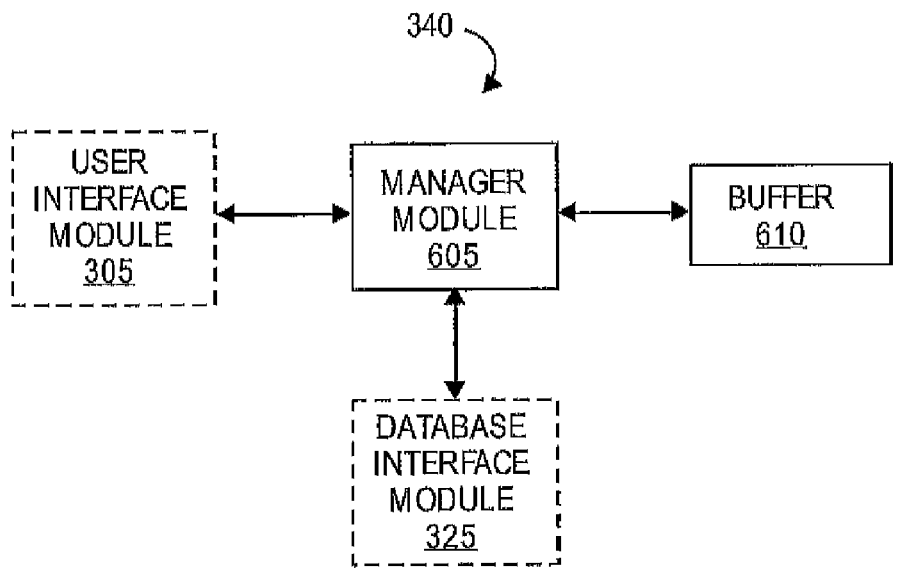
FIG. 6 illustrates an exemplary diagram of the forum module in accordance with yet another embodiment.

FIG. 6 illustrates a block diagram of the directed forum module 340 in accordance with yet another embodiment. It should be readily apparent to those of ordinary skill in the art that the directed forum module 340 depicted in FIG. 6 represents a generalized schematic illustration and that other components may be added or existing components may be removed or modified.

As depicted in FIG. 6, the directed forum module 340 comprises of a manager module 605 coupled to the user interface module 305, the server interface 335, the database interface module 325, and a buffer 610. The manager module 605 is configured to implement the functionality of the directed forum module 340 as previously described and described in greater detail below with respect to FIGS. 7-11. The manager module 605 can be implemented in software code (Java, C, C++, etc.), hardware device (application specific integrated circuit, field programmable gate array, microprocessor, etc.) or combination thereof.

Although the manager module 605 is depicted as a separate module in FIG. 6, it is readily obvious to those of ordinary skill in the art that the functionality of the manager module 605 can be implemented within the controller module 310 or the broker module 315 without departing from the teachings of the present invention.

The manager module 605 can access the user interface module 305 through the existing controller module 310 interfaces with the user interface module 305 as previously described. The user interface module 305 can be configured to generate GUIs to provide for the directed forum, which allow a user to post threads (queries), responses, search the threads of the directed forum, review responses/answers, and other typical functions of conventional forums.

Figure 7:
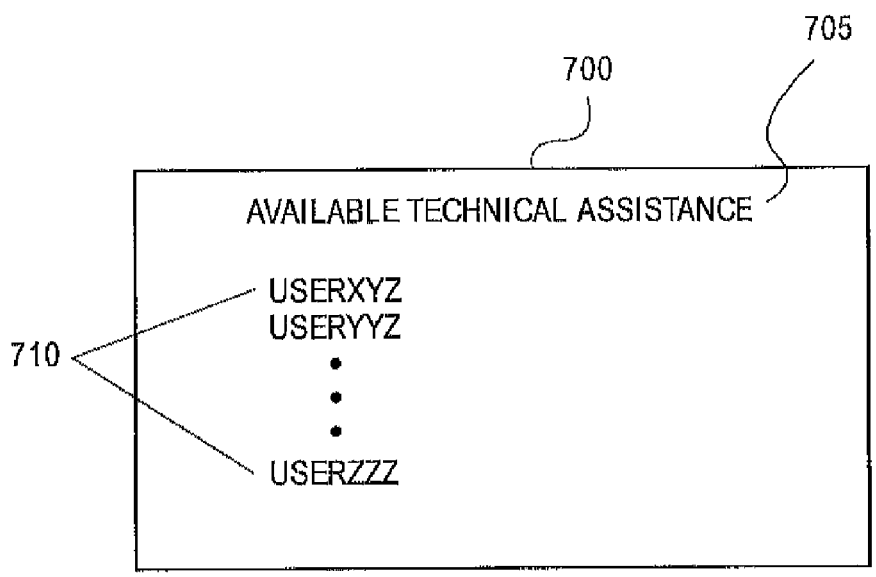
FIG. 7 depicts an exemplary GUI widget in accordance with yet another embodiment.

The user interface module 305 can also, among other things, provide a GUI widget (dialog box, a list view box, etc.) that displays the list of logged-in members of the technical assistance group, i.e., the help group, as shown in FIG. 7. As shown in FIG. 7, GUI widget 700 can be embedded as part of the directed forum GUI that a user sees when the user logs into the directed forum. Alternatively, the GUI widget 700 can be an overlay that is generated over the directed forum GUI. The GUI widget 700 can comprise of a title 705 and a list of logged-in and available technical support personnel 710. The list of available technical support personnel 710 is a dynamic list as members of this group log in and out. Accordingly, the manager module 605 can be configured to add names to the list 710 as they log-in and remove names as participating members log-off.

Returning to FIG. 6, the manager module 605 can be configured to access the database 330 through the existing pathways between the controller module 310 and the database interface module 325. Accordingly, the manager module 605 can issue requests to the database interface 325 to search, store, and retrieve threads from the knowledgebase database 330.

The manager module 605 can be configured to use the server interface 335 to request user profile information from user profile database 235 (see FIG. 2) of the service portal 105. More specifically, the manager module 605 can invoke the request for the user profile and forward the request through the server interface 335 through the broker module 315. The request is received at the broker module 215 of the service portal. The broker module 215 passes the request to the user profile database 235. The return path for the retrieved user profile is the reverse of the forward path.

FIG. 8 illustrates an exemplary user profile 800 in accordance with yet another embodiment. It should be readily apparent to those of ordinary skill in the art that the user profile depicted in FIG. 8 represents a generalized illustration and that other fields may be added or existing fields may be removed or modified.

As shown in FIG. 8, the user profile 800 can comprise of a username field 805, an address field 810, a user rank field 815, a qualification field 820, a rating field 825, a review field 830, and a user status field 835. The username field 805 can indicate the name that the user has selected to be known as in the system 100. Optionally, the user profile can contain fields for the legal name of the user. The user rank field 815 can represent a category of user such as ordinary user, technical support, technical expert, employee, vendor, etc., for the system 100.

The qualification field 820 can represent a technical resume of the user. For example, this field 820 can comprise of a description of the user's experience in Unix or Java programming, Certifications, or years of consulting for various information technology companies.

The rating field 825 can represent a rating of the user given by the user community. In some embodiments of system 100, users can be given a rating based on their participation in the system 100. For example, the user may participate in several forums, posting answers or blogging. As a result of the participation, the other users can evaluate the postings/participation and place this rating in this field 825.

The user status field 835 can represent an availability of the user. More particularly, if the user is busy assisting another user, the user status field 835 can be set to indicate that this user is unavailable. If the user is available, the user status field 835 can be cleared to indicate availability.

The review field 830 can represent a commentary of the user given by the user community. Similar to the rating field 825, the users of the user community may provide commentary of the user such as authenticating the user's qualification based on the user's participation/postings within the system 100.

Returning to FIG. 6, as previously described, the manager module 605 can be configured to add names to the list of available technical support personnel 710 as they log-in and remove names as participating members on the list 710 log-off. The manager module 605 can maintain the list of available technical assistance 710 in the buffer 610. The buffer 610 can be a reserved section of main memory of the underlying server (not shown) that serves as the computing platform of the knowledge server 110.

FIG. 9 illustrates an exemplary flow diagram 900 executed by the directed forum module 340 in accordance with yet another embodiment. It should be readily apparent to those of ordinary skill in the art that the flow diagram 900 depicted in FIG. 9 represents a generalized schematic illustration and that other steps may be added or existing steps may be removed or modified.

As shown in FIG. 9, the manager module 605 can be configured to monitor the log-in of users into the service portal 105, in step 905. For example, the service portal 105 can send a message to the manager module 605 after the user is authenticated.

In step 910, the manager module 605 can send a request for the user profile of the user to the service portal 105 to check whether the user is part of the technical assistance group (or help group). When the user profile is returned, the manager module 605 can check the user status field 715 to determine whether the user is a member of the help group.

If the user is part of the help group, the manager module 605 can be configured to add the user to the help group, i.e., add the username of the user to the list 710, in step 920. Subsequently, the manager module 620 returns to the processing of step 905. Similarly, if the user is not part of the help group, the manager module 605 returns to the processing of step 905.

FIG. 10 illustrates a flow diagram 1000 implemented by the directed forum module 340 in accordance with yet another embodiment. It should be readily apparent to those of ordinary skill in the art that the flow diagram 1000 depicted in FIG. 10 represents a generalized schematic illustration and that other steps may be added or existing steps may be removed or modified.

As shown in FIG. 10, the manager module 605 can monitor for the log-off of users, in step 1005. For example, the service portal 105 can be configured to send a message notifying that a selected user has logged off to the manager module 605.

In step 1010, the manager module 605 can be configured to check the username of the logged-off user with the current list of available technical assistance 710. If there is a username match, the manager module 605 can be configured to update the list 710 by removing the matching username, in step 1015. Otherwise, the manager module 605 returns to the processing of 1005.

Figure 11:
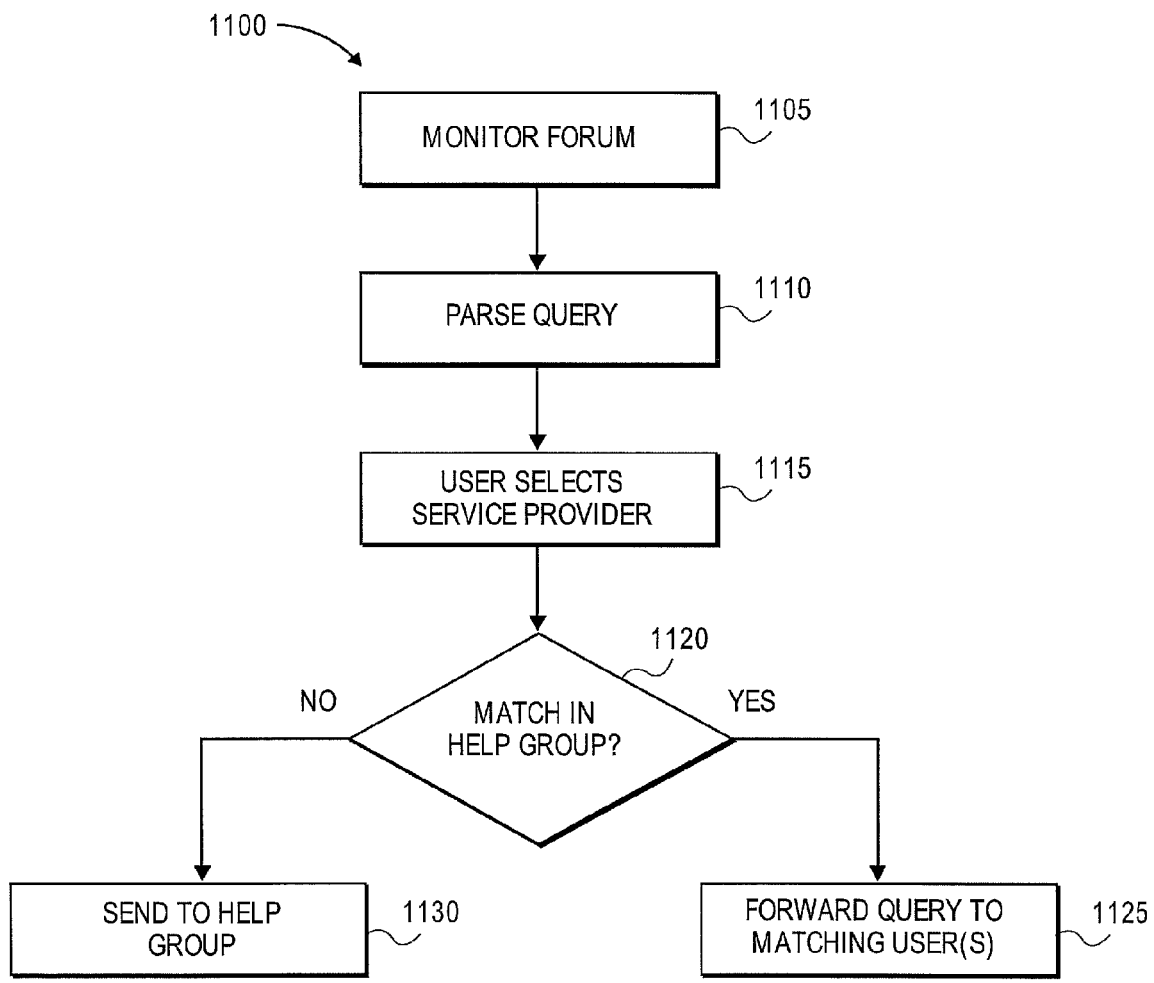
FIG. 11 depicts yet another exemplary flow diagram implemented by the directed forum module in accordance with yet another embodiment.

FIG. 11 illustrates a flow diagram 1100 implemented by the directed forum module 340 in accordance with yet another embodiment. It should be readily apparent to those of ordinary skill in the art that the flow diagram 1100 depicted in FIG. 11 represents a generalized schematic illustration and that other steps may be added or existing steps may be removed or modified.

As shown in FIG. 11, the manager module 605 can monitor the directed forum for queries by users, in step 1105. When a user posts a new thread or query, the manager module 605 can be configured to parse the query for key words, in step 1110. More particularly, the manager module 605 can be configured to search for the key words based on a set of key words developed by the forum administrator and/or user community. The set of key words can be terms that are relevant to the directed forum. For example, a forum related to Linux can have key words such as Red Hat, installation files, configuration files, open source, etc.

In step 1115, the manager module 605 can be configured to perform a similar key word search using the key words from the query on the user profiles of users on the list of available technical assistance 710. The manager module 605 can collate a list of users on the list 710 that have matching terms.

In step 1120, the manager module 605 can be configured to determine which member of the list of available technical assistance 710 is best suited to answer the posted query. The criteria can be a predetermined number of matches between key words of the user profile and query key words.

If the manager module 605 can determine a best available personnel from step 1020, the manager module 605 can forward the posted query or a link to the selected member(s) on the list of available technical assistance 710, in step 1025. Otherwise, the manager module 605 can notify all the members of the list 710 of the posted query. Alternatively, the manager module 605 can return to the processing of step 1105.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of providing directed discussion, the method comprising:
   providing an on-line forum in a service portal;
   providing, an assistance list to a first user of the on-line forum in the service portal wherein the assistance list comprises identifiers of other users of the on-line forum that are members of a help group of the service portal and that are currently available to respond to queries;
   monitoring a user log-in procedure and user log-out procedure at the service portal;
   when a new user logs into the service portal:
      determining a technical status of the new user; and
      when the technical status of the new user indicates being a member of the help group, placing an identifier of the new user on the assistance list;
   when one of the other users identified on the assistance list logs out of the service portal, removing the identifier of the one of the other users from the assistance list;
   receiving a query from the first user at a server device hosting the on-line forum;
   parsing the query for a set of forum-moderated key words that relates to a technical issue of the first user;
   retrieving, using the server device, a set of profiles associated with the other users identified on the assistance list, wherein each profile in the set of profiles comprises technical expertise data associated with a respective user of the other users;
   searching the set of profiles associated with the other users identified on the assistance list with the set of forum-moderated key words to determine an expert user of the other users that has an associated profile with a highest number of key words in the technical expertise data that match the set of forum-moderated key words; and
   directing the query to the expert user.

2. The method of claim 1, further comprising determining a status between the set of forum-moderated key words and the set of profiles.

3. The method of claim 2, wherein the expert user is determined based on the status of a match between the set of forum-moderated key words and the profile associated with the expert user.

4. The method of claim 2, further comprising directing the query to each of the other users identified on the assistance list when there is no match between the set of forum-moderated key words and the set of profiles associated with the other users identified on the assistance list.

5. The method of claim 1, further comprising:
   searching the set of profiles, each profile of the set of profiles comprising a user rank field, a qualification field, a rating field, a user status field and a review field with the set of forum-moderated key words;
   identifying a matching profile from the set of profiles, the matching profile comprising a predetermined number of matches of the set of forum-moderated key words in the query.

6. The method of claim 5, further comprising:
   transmitting a group wide notification when no matching profile is identified.

7. A system for providing a directed forum, the system comprising:
   a processor coupled to memory;
   a network interface coupled to a server and configured to interface with a network; and
   a directed forum module stored in memory and configured to execute on the server and available for access by a plurality of users from remote locations over the network, wherein the directed forum module is configured to
   provide an on-line forum in a service portal;
   provide, an assistance list to a first user of the on-line forum in the service portal wherein the assistance list comprises identifiers of other users of the on-line forum that are members of a help group of the service portal and that are currently available to respond to queries;
   monitor a user log-in procedure and user log-out procedure at the service portal;
   when a new user logs into the service portal:
      determine a technical status of the new user; and
      when the technical status of the new user indicates being a member of the help group, place an identifier of the new user on the assistance list;
   when one of the other users identified on the assistance list logs out of the service portal, remove the identifier of the one of the other users from the assistance list;
   receive a query from the first user in the on-line forum;

parse the query for a set of forum-moderated key words that relates to a technical issue of the first user;

retrieve a set of profiles associated with the other users identified on the assistance list, wherein each profile in the set of profiles comprises technical expertise data associated with a respective user of the other users;

search the set of profiles associated with the other users identified on the assistance list with the set of forum-moderated key words to determine an expert user of the other users that has an associated profile with a highest number of key words in the technical expertise data that match the set of forum-moderated key words; and direct the query to the expert user.

8. The system of claim 7, wherein the directed forum module is further configured to determine a status between the set of forum-moderated key words and the set of profiles.

9. The system of claim 8, wherein the expert user is determined based on the status of a match between the set of forum-moderated key words and the profile associated with the expert user.

10. The system of claim 8, wherein the directed forum module is further configured to direct the query to each of the other users identified on the assistance list when there is no match between the set of forum-moderated key words and the set of profiles associated with the other users identified on the assistance list.

11. The system of claim 7, wherein the direct forum module further configured to:

search the set of profiles, each profile of the set of profiles comprising a user rank field, a qualification field, a rating field, a user status field and a review field with the set of forum-moderated key words;

identify a matching profile from the set of profiles, the matching profile comprising a predetermined number of matches of the set of forum-moderated key words in the query.

12. The system of claim 11, wherein the direct forum module further configured to:

transmit a group wide notification when no matching profile is identified.

13. A non-transitory computer readable storage medium having instructions stored therein that, when executed by a hardware device, cause the hardware device to perform the following operations comprising:

providing an on-line forum in a service portal;

providing a graphical user interface of a dialog box overlaying a forum interface, wherein the forum interface is associated with the on-line forum in the service portal;

monitoring a set of profiles of forum members as the associated forum members log in and log out of the service portal;

populating an assistance list within the dialog box, the assistance list comprising identifiers of forum members that are part of a help group of the service portal and that are currently available to respond to queries;

when a forum member logs into the service portal:
determining a technical status of the forum member; and
when the technical status of the forum member indicates that the forum member is part of the help group, placing an identifier of the forum member on the assistance list;

when a forum member identified on the assistance list logs out of the service portal, removing the identifier of the forum member from the assistance list;

receiving an issue-based thread comprising an initial query;

parsing the initial query for a list of predetermined community terms;

identifying a set of keywords from the initial query and the list of predetermined community terms;

retrieving a set of profiles associated with the forum members in the assistance list, wherein each profile in the set of profiles comprises technical expertise data associated with a respective forum member on the assistance list;

searching the set of profiles associated with the forum members in the assistance list with the set of keywords to determine an expert forum member from the forum members in the assistance list, the expert forum member having an associated profile with a highest number of key words in the technical expertise data that match the set of key words; and transmitting a notification of the initial query to the expert forum member.

14. The non-transitory computer readable storage medium of claim 13, further comprising instructions that, when executed by a hardware device, cause the hardware device to perform the following:

searching the set of profiles of forum members, each profile of the set of profiles comprising a user rank field, a qualification field, a rating field, a user status field and a review field with the set of keywords; and identifying a matching profile from the set of profiles, the matching profile comprising a predetermined number of matches of the set of keywords in the initial query.

15. The non-transitory computer readable storage medium of claim 14, further comprising instructions that, when executed by a hardware device, cause the hardware device to perform the following:

transmitting a group wide notification when no matching profile is identified.

* * * * *